April 3, 1951     S. E. GARUTSO     2,546,995

CONDENSING STEREOSCOPIC LENS

Filed May 4, 1946

INVENTOR.
Stephen E. Garutso
BY William R. Ballard
ATTORNEY.

Patented Apr. 3, 1951

2,546,995

UNITED STATES PATENT OFFICE 2,546,995

CONDENSING STEREOSCOPIC LENS

Stephen E. Garutso, San Fernando, Calif., assignor to Garutso, Inc., a corporation of Delaware Application May 4, 1946, Serial No. 667,328

7 Claims. (Cl. 88—57)

This invention relates to optical lenses, and its objects are to increase the speed of known lenses by augmenting the light gathering power, to improve the fidelity of the blacks and darker shades in the image formed, and to render the image more stereoscopic in appearance.

These objects are attained by a form of light condensing unit designed for use in combination with a conventional objective, such as commercial types of camera, projector, telescope, or microscope lenses. The invention is useful wherever increase in speed and infidelity of image are important, as for example, in color photography and in motion picture photography where cost of lighting is a factor, and it may be used to great advantage in conjunction with optical balance lens assemblies invented by me and covered in my earlier application Serial No. 624,501, filed October 25, 1945, according to which a very great depth of focus is obtained.

In the accompanying drawings

Figure 1:
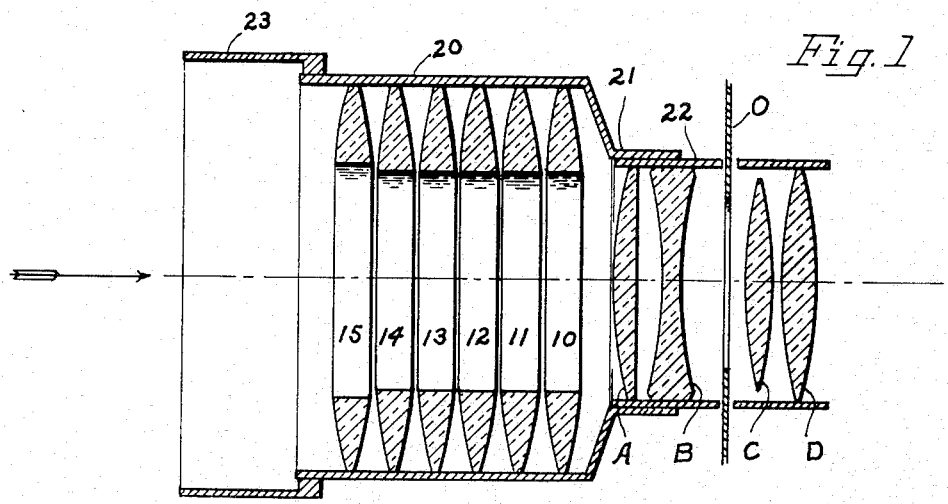
Figure 2:
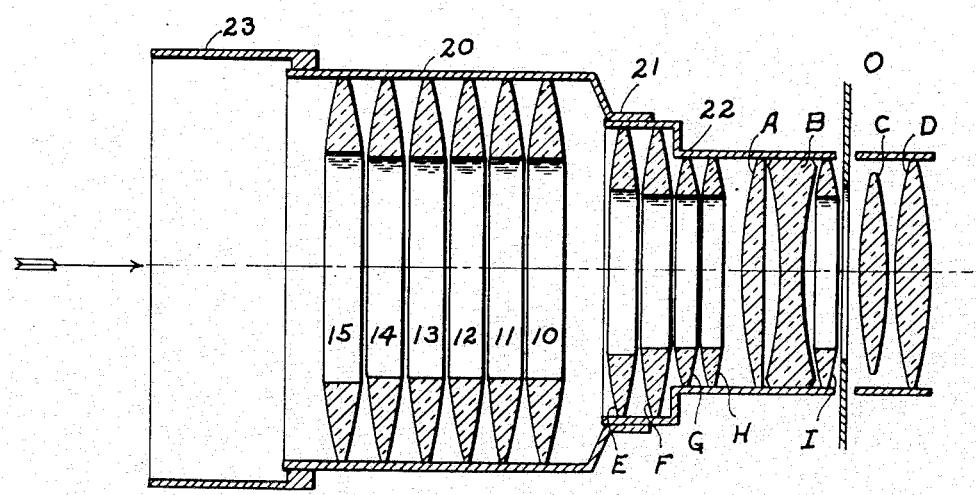

Figure 1 is a medial section of a lens assembly showing the invention applied to a standard type of camera objective, and Figure 2 is a similar section of an assembly in which the invention is embodied in a lens structure containing also the invention of my earlier application above referred to.

In Figure 1, A, B, C, and D represent the lens elements of a conventional objective such, for example, as that commonly used in motion picture photography. The diaphragm for the objective is indicated at 0. In front of the conventional lens—i. e. between the element A and the objects to be viewed or photographed—I place a series of light gathering or condensing lens elements, as indicated at 10, 11, 12, 13, 14 and 15. These have annular refractive areas and central non-refractive areas, preferably in the form of openings. Each of these elements is of considerable refractive power—of the order of several dioptrics—and they are mounted coaxially with the elements of the conventional lens and as close to each other as possible without touching. In the elements 10 to 14 the central openings or non-refractive areas (which are preferably approximately circular) have a diameter just slightly less than the diameter of the element A of the conventional lens. In element 15 this diameter is slightly greater than in the others and may be substantially the same as the diameter of element A. The outside diameter of elements 10 to 15 is not critical but may advantageously be somewhat less than twice the diameter of the element A.

The lens elements 10 to 15 are mounted in a suitable support 20, such as a cylindrical tube, having a reduced end section 21 to fit the mounting 22 of the conventional lens. On the outer end of the support 20 there preferably is mounted a tubular light shield 23 of somewhat larger diameter than the support 20. The inner condensing element 10 is spaced a few millimeters from the element A, and the distance may be made adjustable for optimum effect by having the mounting 20 movable on the mounting 22.

In Figure 2 the light gathering or condensing unit comprising the elements 10 to 15 and their mounting are the same as shown in Figure 1, but the lens with which the unit is combined is one embodying the optical balance principle of my earlier application above named. It comprises the conventional lens elements A, B, C and D and the balancing elements E, F, G, H and I. The balancing elements are in this case placed in front of the conventional lens with the exception of the element I which is shown immediately in front of the diaphragm 0. It is generally found advantageous, though not indispensable, thus to place one of the balancing elements within the body of the conventional lens assembly. The balancing elements have peripheral refractive areas and central non-refractive areas or openings as indicated, and elements G, H and I which lie nearest to the elements A and B of the conventional lens have the same outside diameter as the latter, and their central non-refractive areas or openings have a diameter of approximately two-thirds of their outside diameters. Elements E and F have an outside diameter about 25% greater than that of elements G and H. F may have the same inside diameter as G and H, but the element E which lies in front of the others should have a slightly larger inside diameter in order to avoid formation of double or fuzzy images of some objects lying within the range of the focal depth of the optical balance assembly. As explained in my earlier application above referred to, the effect of these balancing elements overlying the peripheral portions of the conventional lens elements is very greatly to increase the depth of focus of the latter. They have the effect of presenting to the conventional lens the light rays coming from objects located near the camera as if they came from optical infinity (about 35 feet), so that if the conventional lens is focused on its own scale to about that distance objects positioned anywhere from the horizon up to the nearest which the conventional lens is designed to handle, will appear in good focus upon substantially the plane of the principal focus of the latter, and this focal length is not changed substantially by the added balancing elements.

I have discovered that refractive elements of substantial power arranged in an annulus lying for the most part outside the beam of rays passing through the conventional lens parallel to its principal axis, act as a condensing lens and serve to bring to the conventional lens a greatly increased amount of light from the scene to be viewed or photographed, without changing the focal length of the conventional lens itself. The additional light gathered is considerably in excess of the light lost by absorption in the added units so that there is a large net gain. The increased light makes it possible to take pictures with shorter exposures or with smaller diaphragm openings than otherwise, or to photograph through a haze that would otherwise prove prohibitive. Of perhaps still more value is the fact that it makes it possible to get truer values in the blacks and near-blacks and to do this without the use of red filters and without the loss of speed incident to the use of filters. The realistic rendition of the blacks and darker areas gives the resulting image a stereoscopic appearance.

By placing the balancing elements largely in front of the conventional lens as here disclosed and by making them of substantial refractive power they themselves can be made to contribute something to the light gathering effect and so to counterbalance loss of light by absorption in the various lens elements.

From what has been said it is clear that the size and proportions of the light condensing unit will be varied to meet the size and requirements of the conventional lens with which it is to be used; and the same is true of course of the balancing elements when these are to be included in the combination. However I will now give a specific example of a condensing assembly suitable for combination with a particular commercial lens to secure the benefits of the present invention. A lens much used in the taking of motion pictures is the Cooke cinema lens of 3 inch (76.2 mm.) focal length and speed of f/2.5. This comprises four lens elements corresponding substantially to those shown on the drawing at A, B, C and D, and the front element (A) has an effective outside diameter of 30 millimeters. With this conventional lens the condensing elements as shown in Figure 1 may be as follows:

[Outside diameter of all the elements, 50 millimeters. Index of refraction of all elements, 1.523.]

| Element | Inside diameter | Refractive power | Focal length |
|---|---|---|---|
| | Millimeters | | Millimeters |
| 10 | 29 | +9 dioptrics | 111 |
| 11 | 29 | +9 dioptrics | 111 |
| 12 | 29 | +9 dioptrics | 111 |
| 13 | 29 | +10 dioptrics | 100 |
| 14 | 29 | +10 dioptrics | 100 |
| 15 | 30 | +10 dioptrics | 100 |

The elements are placed as close together as possible without actual contact, and the group is spaced approximately eight millimeters in front of the element A of the Cooke lens.

For combination with the same commercial Cooke lens and the condensing unit above specified, the elements of the optical balancing arrangement (as shown in Fig. 2) may be as follows:

[Index of refraction of all elements, 1.523.]

| Element | Inside diameter | Outside diameter | Refractive power | Focal length |
|---|---|---|---|---|
| | Millimeters | Millimeters | | Millimeters |
| E | 22 | 38 | +7 dioptrics | 143 |
| F | 20 | 38 | +7 dioptrics | 143 |
| G | 20 | 30 | +4 dioptrics | 250 |
| H | 20 | 30 | +5 dioptrics | 200 |
| I | 20 | 30 | +10 dioptrics | 100 |

Elements E, F, G and H lie as close to each other as possible without actual contact, and the group is spaced approximately three millimeters in front of the element A and approximately eight millimeters back of element 10 of the condensing unit. Element I lies as close to element B as possible without actual contact.

The increased speed resulting from the light condensing effect in an assembly of this kind is such that a gain of about two points in diaphragm opening results; that is, an exposure under conditions normally calling for an f/5.6 aperture with the commercial lens alone, can be made successfully by the use of this assembly with an aperture only slightly larger than f/8, and in some cases even smaller.

The conventional lens to which my light gathering elements are added will preferably have the known corrections for spherical and chromatic aberration, etc., and the light gathered by the condensing elements will have the benefit of these corrections since by reason of the position of these elements the light gathered by them must subsequently pass through the conventional lens. The same applies to the light passing through the balancing elements E, F, G and H.

The particular construction herein described as illustrating my invention can obviously be modified in considerable degree by the use of various optical equivalents without departing from the essence of the invention disclosed and covered in the appended claims.

What I claim as my invention and desire to secure by Letters Patent is:

1. In combination in a photographic objective: a multiple element conventional objective corrected for spherical and chromatic aberration, astigmatism, distortion, and coma, said conventional objective having a diameter $d$ and a focal length $f$; and a positive annular lens coaxially positioned in front of said conventional objective, having a focal length greater than $f$ and less than $1.45f$, and having an internal diameter substantially equal to $d$ and an external diameter not greater than $1.67d$.

2. The construction of claim 1 further characterized by having mounting means for said annular lens which is movably carried by said conventional objective whereby to permit adjustment of the axial spacing of said conventional objective and annular lens.

3. In combination in a photographic objective: a multiple element conventional objective corrected for spherical and chromatic aberration, astigmatism, distortion, and coma, said conventional objective having a diameter $d$, and a focal length $f$; and a positive annular lens coaxially positioned in front of said conventional objective and spaced not less than $.105f$ from the foremost element in said conventional objective, the internal diameter of said annular lens being not less than $.966d$ and the external diameter of said annular lens being not greater than $1.67d$, and said annular lens having a focal length greater than $f$ and less than $1.45f$.

4. In combination in a photographic objective: a multiple element conventional objective corrected for spherical and chromatic aberration, astigmatism, distortion, and coma, said conventional objective having a diameter $d$ and a focal length $f$; and a positive annular lens coaxially positioned in front of said conventional objective and spaced not less than $.105f$ from the foremost element in said conventional objective, the internal diameter of said annular lens being not less than $.966d$ and the external diameter of said annular lens being not greater than $1.67d$, and said annular lens having a focal length greater than 1.31$f$ and less than 1.45$f$.

5. In combination in a photographic objective: a multiple element conventional objective corrected for spherical and chromatic aberration, astigmatism, distortion, and coma, said conventional objective having a diameter $d$ and a focal length $f$; and a positive annular lens coaxially positioned in front of said conventional objective and having an internal diameter substantially equal to $d$ and an external diameter not greater than 1.67$d$, said annular lens having a focal length greater than $f$ and less than 1.45$f$.

6. In combination in a photographic objective: a multiple element conventional objective corrected for spherical and chromatic aberration, astigmatism, distortion, and coma, said conventional objective having a diameter $d$ and a focal length $f$; and a plurality of positive annular lenses coaxially positioned in front of said conventional objective, said annular lenses having focal lengths ranging from 1.31$f$ to 3.28$f$ and having internal diameters ranging from .67$d$ to $d$, and external diameters ranging from $d$ to 1.67$d$.

7. The construction of claim 6 further characterized in that said annular lenses are arranged in two axially spaced groups, the lenses in each group being substantially in face-to-face contact with each other, one of said groups comprising lenses having focal lengths between 1.31$f$ to 3.28$f$ and external diameters between $d$ and 1.27$d$, said first group being spaced not less than .1$f$ in front of the foremost element of said conventional objective, and the other of said groups comprising lenses having focal lengths between $f$ and 1.45$f$ and external diameters between 1.27$d$ and 1.67$d$, said second group being spaced not less than .105$f$ in front of the foremost lens in said first group.

STEPHEN E. GARUTSO.

REFERENCES CITED

The following references are of record in the file of this patent:

UNITED STATES PATENTS

| Number | Name | Date |
|---|---|---|
| 660,747 | Bausch | Oct. 30, 1900 |
| 1,154,232 | Byron | Sept. 21, 1915 |
| 1,540,752 | Bielicke | June 9, 1925 |
| 1,954,755 | Heine | Apr. 10, 1934 |
| 1,979,159 | Howser | Oct. 30, 1934 |
| 2,004,806 | Ellestad | June 11, 1935 |

FOREIGN PATENTS

| Number | Country | Date |
|---|---|---|
| 193,969 | Great Britain | Mar. 2, 1923 |
| 373,755 | Germany | Apr. 16, 1923 |
| 622,100 | France | Feb. 19, 1927 |
| 335,696 | Great Britain | Oct. 2, 1930 |